(12) United States Patent
Kondo et al.

(10) Patent No.: US 6,432,025 B1
(45) Date of Patent: Aug. 13, 2002

(54) APPARATUS FOR INCREASING VEHICLE DRIVE POWER SOURCE OUTPUT UPON ACCELERATOR REDAL OPERATION DURING VEHICLE COASTING WITH AUTOMATIC TRANSMISSION IN RELEASED STATE

(75) Inventors: Masami Kondo, Toyota; Yasunari Nakamura, Nagoya, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/557,412

(22) Filed: Apr. 21, 2000

(30) Foreign Application Priority Data

Apr. 30, 1999 (JP) ............................................ 11-123654

(51) Int. Cl.[7] .............................................. B60K 41/02
(52) U.S. Cl. ........................................ 477/110; 477/111
(58) Field of Search ................................ 477/107, 110, 477/111

(56) References Cited

U.S. PATENT DOCUMENTS

| 4,454,789 | A | * | 6/1984 | Kaspar et al. | 477/83 |
| 4,724,723 | A | * | 2/1988 | Lockhart et al. | 477/110 X |
| 5,498,195 | A | * | 3/1996 | White et al. | 477/110 |
| 5,651,752 | A | * | 7/1997 | Wakahara et al. | 477/110 X |
| 5,672,138 | A | * | 9/1997 | Mikami et al. | 477/111 |
| 5,863,275 | A | * | 1/1999 | Nozaki et al. | 477/110 |

FOREIGN PATENT DOCUMENTS

| JP | 3-117763 | | 5/1991 | |
| JP | 5306762 | * | 11/1993 | 477/110 |
| JP | 6001163 | * | 1/1994 | 477/107 |

* cited by examiner

Primary Examiner—Rodney H. Bonck
Assistant Examiner—Ha Ho
(74) Attorney, Agent, or Firm—Oblon, Spivak, McClelland, Maier & Neustadt, P.C.

(57) ABSTRACT

Vehicle control apparatus for effecting cooperative control of an automatic transmission and a drive power source which produces an output to drive the vehicle through the automatic transmission, the automatic transmission incorporating a frictional coupling device which is engaged to place the automatic transmission in a power transmitting state, during power driving of the vehicle with the output of the drive power source, and is released to place the automatic transmission in a power disconnecting state, during coasting of the vehicle. The apparatus includes a device for determining whether a control initiating condition required to initiate an output increase control for temporarily increasing the output of the drive power source is satisfied or not, depending upon whether an operation to accelerate the vehicle is performed during the vehicle coasting while the frictional coupling device is placed in a released state, and a device which is operated when the control initiating condition is satisfied, for effecting the output increase control such that the output of the drive power source is larger by a predetermined amount than when the output increase control is not effected.

11 Claims, 10 Drawing Sheets

FIG. 2

|      | C0 | C1 | C2 | B0 | B1 | B2 | B3 | B4 | F0 | F1 | F2 |
|------|----|----|----|----|----|----|----|----|----|----|----|
| N    |    | ○  |    |    |    |    |    |    |    |    |    |
| Rev  |    |    | ○  | ○  |    |    |    | ○  |    |    |    |
| 1st  | ○  | ○  |    |    |    |    |    | ●  | ○  |    | ○  |
| 2nd  | ●  | ○  |    |    |    |    | ○  |    | ○  |    |    |
| 3rd  | ○  | ○  |    |    | ●  | ○  |    |    | ○  | ○  |    |
| 4th  | ○  | ○  | ○  |    |    | △  |    |    | ○  |    |    |
| 5th  |    | ○  | ○  | ○  |    | △  |    |    |    |    |    |

APPARATUS FOR INCREASING VEHICLE DRIVE POWER SOURCE OUTPUT UPON ACCELERATOR REDAL OPERATION DURING VEHICLE COASTING WITH AUTOMATIC TRANSMISSION IN RELEASED STATE

BACKGROUND OF THE INVENTION

1. Field of the Invention

The present invention relates to a cooperative control apparatus adapted to effect cooperative control of an automatic transmission incorporating a frictional coupling device which is engaged during power driving of the vehicle and released during coasting of the vehicle, and an engine which generates a power to drive the vehicle through the automatic transmission.

2. Discussion of the Related Art

There is known an automotive vehicle having an automatic transmission equipped with a frictional coupling device such as a one-way clutch, which is placed in its engaged state during power driving of the vehicle with an engine power and is placed in its released state during coasting of the vehicle so as to inhibit engine braking while a shift lever is placed in a drive position "D", for instance. An example of such a vehicle is disclosed in JP-A-3-117763.

In an automotive vehicle having an automatic transmission equipped with a frictional coupling device as described above, there arises a large difference between the input speed of the automatic transmission and the synchronizing speed (which is the output speed multiplied by the currently established speed ratio of the automatic transmission), immediately after a shift-down action of the automatic transmission which takes place due to a drop of the running speed of the vehicle during a coasting run as a result of a releasing operation of the accelerator pedal toward its non-operated or engine-idling position. The large speed difference indicated above requires a relatively long time for the input speed of the automatic transmission to rise to the synchronizing speed when the accelerator pedal is again depressed to accelerate the vehicle. Accordingly, the frictional coupling device requires a long response time, namely, it takes a long time for the frictional coupling device to be engaged to transmit the engine power to the vehicle drive wheels, unfavorably resulting in deteriorated drivability of the vehicle as felt by the vehicle operator.

SUMMARY OF THE INVENTION

It is therefore an object of the present invention to provide a cooperative control apparatus for controlling an automatic transmission and an engine of an automotive vehicle, which apparatus permits the engine power to be transmitted to the vehicle drive wheels in a relatively short time after an operation of the accelerator pedal to accelerate vehicle following a coasting run of the vehicle.

The above object may be achieved according to the principle of the present invention, which provides a cooperative control apparatus for controlling an automotive vehicle, so as to effect a cooperative control of an automatic transmission and a drive power source which produces an output to drive the vehicle through the automatic transmission, the automatic transmission incorporating a frictional coupling device which is engaged to place the automatic transmission in a power transmitting state, during power driving of the vehicle with the output of the drive power source, and is released to place the automatic transmission in a power disconnecting state, during coasting of the vehicle, the cooperative control apparatus comprising: control initiating condition determining means for determining whether a control initiating condition required to initiate an output increase control for temporarily increasing the output of the drive power source is satisfied or not, depending upon whether an operation to accelerate the vehicle is performed during the coasting of the vehicle while the frictional coupling device is placed in a released state; and output increase control means operable when the control initiating condition determining means determines that the control initiating condition is satisfied, for effecting the output increase control such that the output of the drive power source is larger by a predetermined amount than when the output increase control is not effected.

In the cooperative control apparatus of the present invention constructed as described above, the output of the drive power source is made larger by the predetermined amount by the output increase control means when the control initiating determining means determines that the control initiating condition is satisfied, upon an operation to accelerate the vehicle during coasting of the vehicle with the frictional coupling device placed in the released state, than when the control initiating determining means does not determine that the control initiating condition is satisfied. The output increase control is effective to reduce the time required for the input shaft speed of the automatic transmission to be raised to the synchronizing speed which is a product of the output shaft speed and the speed ratio of the currently established forward drive position of the automatic transmission during the vehicle coasting. Accordingly, the output increase control reduces the accelerating response time from the moment of the vehicle accelerating operation to the moment of engagement of the frictional coupling device to enable the automatic transmission to transmit the vehicle drive power, so that the drivability of the vehicle as felt by the vehicle operator is improved.

In one preferred form of this invention, the frictional coupling device is a one-way clutch which is placed in an engaged state during the power driving of the vehicle, and is placed in the released state when an input shaft speed of the automatic transmission is lower than a synchronizing speed which is a product of an output shaft speed of the automatic transmission and a speed ratio of a currently established forward drive position of the automatic transmission. This one-way clutch is mechanically constructed such that the one-way clutch is automatically engaged when a power is transmitted from the drive power source to drive wheels of the automotive vehicle, and is automatically released when a power is transmitted in the reverse direction. In this form of the invention, the one-way clutch need not be electrically controlled to place this one-way clutch in the released state.

In another preferred form of this invention, the output increase control means increases the output of the drive power source such that an input shaft speed of the automatic transmission in the process of increase of the output of the drive power source does not exceed a synchronizing speed which is a product of an output shaft speed of the automatic transmission and a speed ratio of a currently established forward drive position of the automatic transmission. This form of the invention does not suffer from a rapid reduction in the rate of increase of the input shaft speed of the automatic transmission upon engagement of the frictional coupling device, so that an otherwise possible engaging shock of the frictional coupling device can be suitably avoided.

In a further preferred form of this invention, the output increase control means increases the output of the drive power source such that the output is kept increased while an input shaft speed of the automatic transmission is not higher than a synchronizing speed which is a product of an output shaft speed of the automatic transmission and a speed ratio of a currently established forward drive position of the automatic transmission. In this form of the invention, the input shaft speed of the automatic transmission can be rapidly raised to a value close to the synchronizing speed, whereby the accelerating response of the vehicle can suitably be improved.

In a yet further preferred form of this invention, the control initiating condition determining means includes input shaft speed determining means for determining whether an input shaft speed of the automatic transmission is lower than a synchronizing speed minus a predetermined first value, the synchronizing speed being a product of an output shaft speed of the automatic transmission and a speed ratio of a currently established forward drive position of the automatic transmission. The output increase control means continues to increase the output of the drive power source while the input shaft speed determining means determines that the input shaft speed is lower than the synchronizing speed minus the predetermined first value. In this form of the invention, the control initiating condition determining means does not determine that the control initiating condition is satisfied, when the input shaft speed is not lower than the synchronizing speed minus the predetermined first value. This form of the invention is effective to avoid an unnecessary operation to increase the output of the drive power source, and assure the initiation of the output increase control of the drive power source immediately before the input shaft speed of the automatic transmission has reached the synchronizing speed, so that an engaging shock of the automatic transmission can be suitably prevented.

In a still further preferred form of this invention, the control initiating condition determining means includes includes shift-down completion determining means for determining whether a shift-down action of the automatic transmission which has been initiated before the operation to accelerate the vehicle during the coasting of the vehicle has been substantially completed. The control initiating condition determining means determines that the control initiating condition is satisfied, when the shift-down completion determining means determines that the shift-down action has been substantially completed. In this form of the invention, the initiation of the output increase control of the drive power source can be avoided when the frictional coupling device which should be engaged to complete the shift-down action is still partially released or or slipping.

In another preferred embodiment of this invention, the control initiating condition determining means includes pre-shift-up-initiation determining means for determining whether a frictional coupling device which should be engaged to effect a shift-up action of the automatic transmission following a shift-down action of the automatic transmission which has been commanded before the operation to accelerate the vehicle during the coasting of the vehicle has not been substantially engaged. The control initiating condition determining means determines that the control initiating condition is satisfied, when the pre-shift-up-initiation determining means determines that the frictional coupling device which should be engaged to effect the shift-up action has not been substantially engaged. In this form of the invention, the output increase control of the drive power source is effected even after the generation of a command to shift up the automatic transmission, until the frictional coupling coupling device which should be engaged to effect the shift-up action has been substantially engaged.

In a further preferred form of this invention, the control initiating condition determining means includes vehicle acceleration determining means for determining whether an acceleration value of the vehicle is lower than a predetermined lower limit, and determines that the control initiating condition is satisfied, when the vehicle acceleration determining means determines that the acceleration value of the vehicle is lower than the predetermined lower limit. This form of the invention is effective to prevent the output increase control of the drive power source after the vehicle has been sufficiently accelerated, for some reason or other.

In a still further preferred form of this invention, the cooperative control apparatus further comprises control terminating condition determining means for determining whether a control terminating condition required to terminate the output increase control of the output of the drive power source is satisfied, the control terminating condition determining means including at least one of (a) time lapse monitoring means for determining whether a time lapse after a moment of initiation of an increase of the output of the drive power source has exceeded a predetermined maximum increase period, (b) input shaft speed determining means for determining whether an input shaft speed of the automatic transmission has been raised above a synchronizing speed minus a predetermined second value, the synchronizing speed being a product of an output shaft speed of the automatic transmission and a speed ration of a currently established forward drive position of the automatic transmission, and (c) accelerator non-operation detecting means for determining whether an accelerator pedal which has been depressed to perform the operation to accelerate the vehicle during the coasting of the vehicle has been returned to a non-operated position thereof, the control terminating means determining that the control terminating condition is satisfied, when at least one of the time lapse monitoring means, the input shaft speed determining means and the accelerator non-operation detecting means obtains an affirmative decision, the output increase control means continuing the output increase control of the output of the drive power source until the control terminating condition determining means determines that the control terminating condition is satisfied. In this form of the invention, the output increase control of the drive power source is restricted in terms of the time period of the output increase and the input shaft speed of the automatic transmission, and is prevented when the vehicle operator does not have an intention to accelerate the vehicle during its coasting run.

In a yet further preferred form of this invention, the output increase control means increases the output of the drive power source by an amount up to a predetermined maximum amount at a predetermined rate, hold the output at the increased value for a period of time which is a difference of a predetermined maximum period of increase of the output minus a period of time for which the output has been increased by the predetermined maximum amount, and then reduce the output at a predetermined rate. This form of the invention is effective to avoid an abrupt increase or decrease in the intake air quantity of the drive power source, thereby preventing an increase in the concentration of noxious gases in the exhaust emission. This arrangement is particularly effective where the drive power source is an engine having a relatively large displacement, and a high tendency of air intake delay.

In a still another preferred form of this invention, the output increase control means includes increase amount determining means for determining a maximum amount of increase of the output of the drive power source depending upon a difference between a synchronizing speed and an input shaft speed of the automatic transmission, the synchronizing speed being equal to a product of an output shaft speed of the automatic transmission and a speed ratio of a currently established forward drive position of the automatic transmission, the output increase control means increasing the output of the drive power source by an amount up to the maximum amount determined by the increase amount determining means. In this form of the invention, the output of the drive power source is increased by an amount up to the determined maximum amount determined by the increase amount determining means. Accordingly, the output of the drive power source is increased by an appropriate amount corresponding to the above-indicated difference, to assure a sufficiently high degree of accelerating response of the vehicle while avoiding a shock of the automatic transmission upon engagement of the frictional coupling device.

BRIEF DESCRIPTION OF THE DRAWINGS

The above and other objects, features, advantages and technical and industrial significance of this invention will be better understood and appreciated by reading the following detailed description of presently preferred embodiments of the invention, when considered in connection with the accompanying drawing, in which:

FIG. 2 is a view indicating combinations of operating states of various hydraulically operated frictional coupling devices provided in the automatic transmission of the vehicle of FIG. 1 in relation to operating positions of the automatic transmission;

DETAILED DESCRIPTION OF THE PREFERRED EMBODIMENTS

Figure 1:
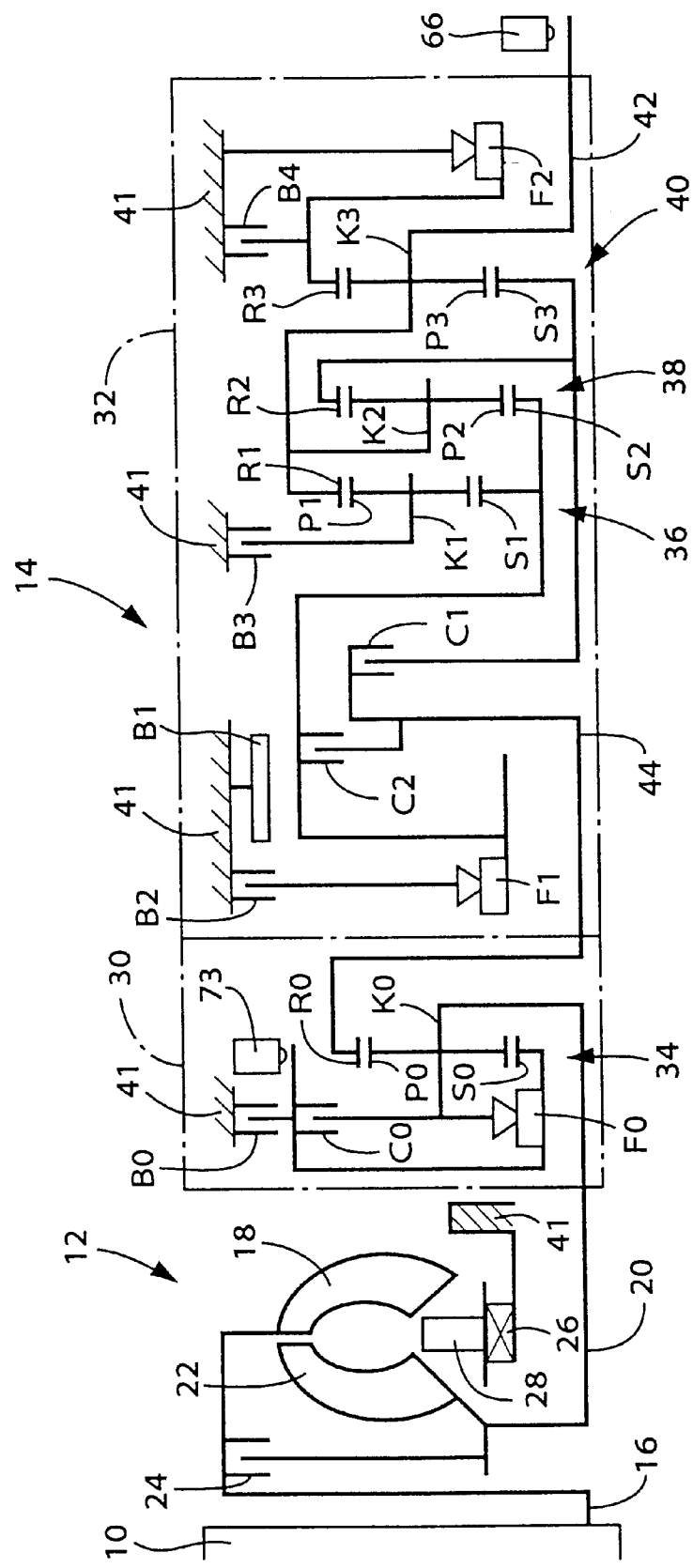
FIG. 1 is a schematic view illustrating a power transmitting system of an automotive vehicle including an engine and an automatic transmission, which are controlled by a cooperative control apparatus constructed according to one embodiment of this invention.

Referring first to FIG. 1, there is schematically shown a power transmitting system of an automotive vehicle equipped with a cooperative control apparatus constructed according to one embodiment of this invention. In FIG. 1, reference numeral 10 denotes a drive power source in the form of an internal combustion engine of an air-fuel mixture suction type or a fuel injection type, or an external combustion engine. The output of the engine 10 is transmitted to an automatic transmission 14 through a torque converter 12, and to drive wheels of the vehicle through a differential gear device and drive axles.

The torque converter 12 includes: a pump impeller connected to a crankshaft 16 of the engine 10; a turbine impeller 22 connected to an input shaft 20 of the automatic transmission 14; a lock-up clutch 24 connecting the pump impeller 18 and the turbine impeller 22; and a stator 28 whose rotation in one direction is inhibited by a one-way clutch 26.

The automatic transmission 14 includes a first transmission unit 30 having a high-speed position and a low-speed position, and a second transmission unit 32 having one reverse drive position and five forward drive positions. The first transmission unit 30 includes: a high-low planetary gear set 34 including a sun gear S0, a ring gear R0, and a planetary gear P0 which is rotatably supported by a carrier K0 and which meshes with the sun gear S0 and the ring gear R0; a clutch C0 and a one-way clutch F0 which are connected between the sun gear S0 and the carrier K0; and a brake B0 connected between the sun gear S0 and a housing 41.

The second transmission unit 32 includes: a first planetary gear set 36 including a sun gear S1, a ring gear R1, and a planetary gear P1 which is rotatably supported by a carrier K1 and which meshes with the sun gear S1 and the ring gear R1; a second planetary gear set 38 including a sun gear S2, a ring gear R2, and a planetary gear P2 which is rotatably supported by a carrier K2 and which meshes with the sun gear S2 and the ring gear R2; and a third planetary gear set 38 including a sun gear S3, a ring gear R3, and a planetary gear P4 which is rotatably supported by a carrier K3 and which meshes with the sun gear S3 and the ring gear R3.

The sun gears S1 and S2 indicated above are connected integrally with each other, while the ring gear R1, carrier K2 and carrier K3 are connected integrally with each other. The carrier K3 is connected to an output shaft 42 of the automatic transmission 14. The ring gear R2 and the sun gear S3 are connected integrally with each other. A clutch C1 is connected between an integral unit of the ring gear R2 and the sun gear S3 and an intermediate shaft 44, while a clutch C2 is connected between an integral unit of the sun gears S1, S2 and the intermediate shaft 44. Further, a brake B1 of band type is provided on the housing 41 to inhibit rotation of the sun gears S1, S2, and a one-way clutch F1 and a brake B2 are connected in series with each other between the integral unit of the sun gears S1, S2 and the housing 41. The one-way clutch F1 is adapted to be engaged when a torque is transmitted to the sun gears S1, S2 so as to rotate these sun gears in a direction opposite to the direction of rotation of the input shaft 20.

A brake B3 is disposed between the carrier K1 and the housing 41, while a brake B4 and a one-way clutch F2 are disposed in parallel with each other between the ring gear R3 and the housing 41. The one-way clutch F1 is adapted to be engaged when a torque is transmitted to the ring gear R3 so as to rotate this ring gear in the direction opp?site to the direction of rotation of the input shaft 20.

The automatic transmission 14 constructed as described above is selectively placed in one of the reverse drive position "Rev" and the five forward drive positions "1st", "2nd", "3rd", "4th" and "5th" which have respective different speed ratios, by controlling the operating states of the clutches C0, C1 and C2, brakes B0, B1, B2, B3 and B4 and one-way clutches F0, F1 and F2, as indicated in the table of FIG. 2 wherein white circles indicate the engaged state, while the blanks indicate the released state, and black circles indicate the engaged state which is established when an engine brake is applied to the vehicle. It will be understood from the table of FIG. 2 that an engine brake is applied to the vehicle with the brake B4 placed in the engaged state, during coasting of the vehicle with an accelerator pedal 50 held in the non-operated position while the automatic transmission 14 is placed in the 1st-speed position "1st" (lowest gear position) with a shift lever 72 placed in one of engine braking positions, namely, in one of a MANUAL position "M", a 3RD position "3", a 2ND position "2" and a LOW position "L". When the automatic transmission 14 is placed in the 1st-speed position "1st" with the shift lever 72 placed in a DRIVE position "D", the brake B4 is placed in the released state, so that a slipping action of the one-way clutch F2 and a racing or non-load rotation of the ring gear G4 are permitted, whereby power is not transmitted from the drive wheels to the engine 10 through the automatic transmission 14 even while the vehicle is coasting with the accelerator pedal 50 held in the non-operated position. During the coasting run of the vehicle in this condition, therefore, an engine brake will not be applied to the vehicle. When the automatic transmission 14 is placed in the 2nd-speed position "2nd" during coasting of the vehicle, the clutch C0 is similarly placed in the released state, to permit a slipping action of the one-way clutch F0. As described above, the clutch F2 is placed in the released state during coasting of the vehicle with the automatic transmission 14 placed in the 1st-speed position "1st". Thus, the one-way clutch F2 functions as a frictional coupling device which is placed in the engaged state to place the automatic transmission 14 in a power transmitting state while the vehicle is driven with the output of the engine 10, and in the released state to place the automatic transmission 14 in a power disconnecting state while the vehicle is coasting with a kinetic energy of the vehicle. Described more specifically, the one-way clutch F2 function as a frictional coupling device which is engaged to permit the automatic transmission 14 placed in the 1st-speed position "1st" to transmit the engine output to the drive wheels to drive the vehicle while the accelerator pedal 50 is depressed, but is released during coasting of the vehicle with the accelerator pedal 50 in the non-operated position, to inhibit the automatic transmission 14 in the 1st-speed position "1st" from transmitting a power or torque from the drive wheels to the engine 10, that is, to inhibit the application of an engine brake to the vehicle.

Figure 3:
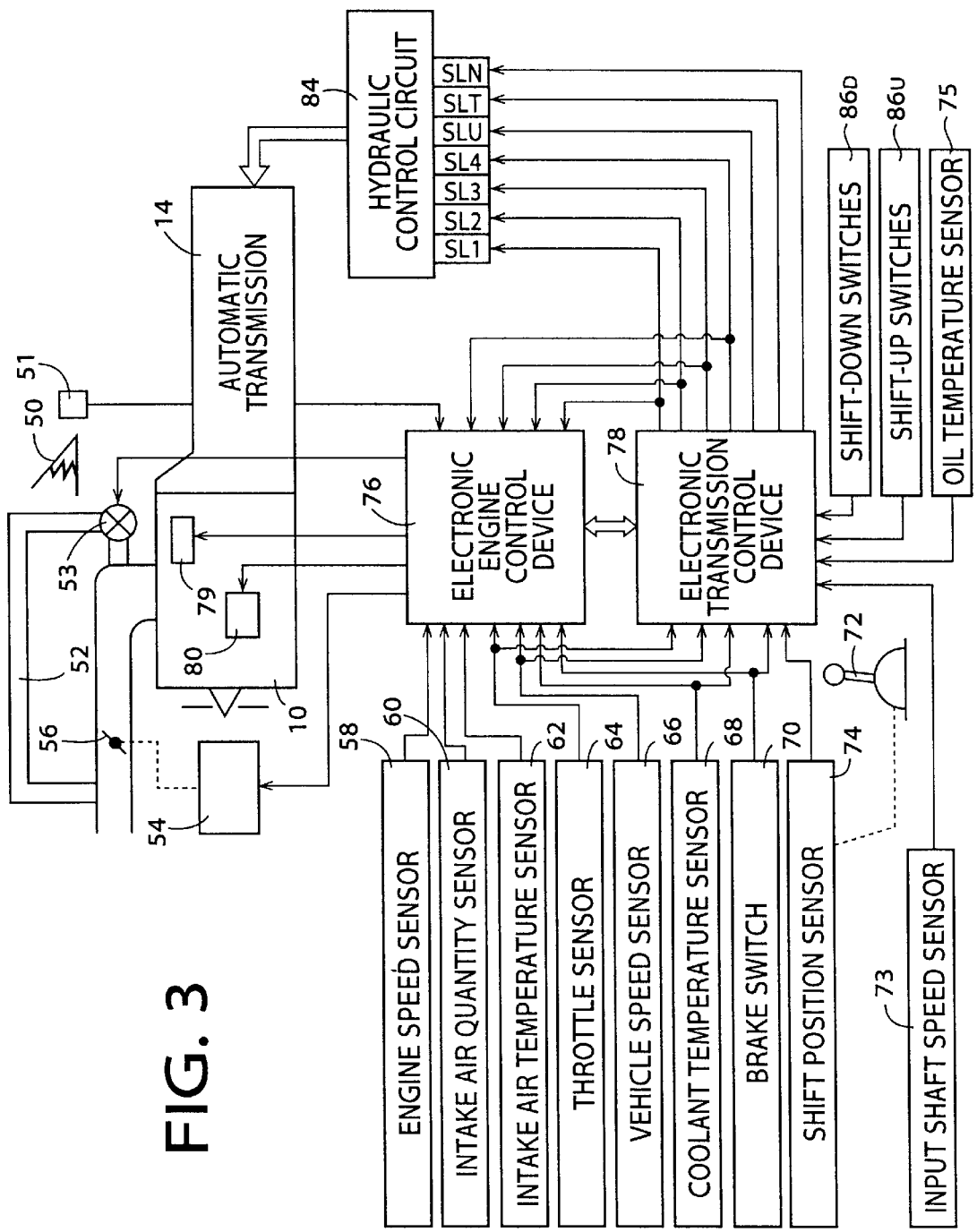
FIG. 3 is a block diagram showing an electrical arrangement of control devices for controlling the engine and automatic transmission of the vehicle of FIG. 1.

As shown in FIG. 3, an accelerator sensor 51 is provided to detect an operating amount $A_{CC}$ of the accelerator pedal 50. Based on the detected operating amount $A_{CC}$ of the accelerator pedal 50, a throttle actuator 54 disposed in an intake pipe of the engine 10 is operated to control an opening angle $\theta_{TH}$ of a throttle valve 56. To control the idling speed of the engine 10, there is provided an idling speed control valve 53 (ISC valve 53) in a by-pass passage 52 which by-passes the throttle valve 56. The ISC valve 53 is adapted to control an intake air quantity Q of the engine 10 while the throttle valve 56 is placed in the engine idling position. Thus, the engine idling speed is controlled by the ISC valve 53.

The power transmitting system of the automotive vehicle uses various sensors including: an engine speed sensor 58 for detecting a speed $N_E$ of the engine 10; an intake air quantity sensor 60 for detecting the intake air quantity Q of the engine 10; an intake air temperature sensor 62 for detecting a temperature $T_A$ of the intake air; a throttle sensor 64 which is adapted to detect the opening angle $\theta_{TH}$ of the throttle valve 56 and which is provided with an idling detector switch for detecting that the throttle valve 56 is placed in the engine idling position; a vehicle speed sensor 66 for detecting a speed $N_{OUT}$ of the output shaft 42 of the automatic transmission 14, to obtain a running speed V of the vehicle; a coolant temperature sensor 68 for detecting a temperature $T_W$ of cooling water of the engine 10; a brake switch 70 for detecting an operation of a braking system; an input shaft speed sensor 73 for detecting a speed $N_{IN}$ of the input shaft 20 of the automatic transmission 14, that is, a speed $N_{CO}$ of the clutch C0 (i.e., speed $N_T$ of the turbine impeller 22); a shift position sensor 74 for detecting a currently selected position $P_{SH}$ of the shift lever 72; and an oil temperature sensor 75 for detecting a temperature $T_{OIL}$ of a working fluid in a hydraulic control circuit 84 for the automatic transmission 14. Signals representative of the engine speed $N_E$, intake air quantity Q, intake air temperature $T_A$, throttle valve opening angle $\theta_{TH}$ vehicle running speed V, cooling water temperature $T_W$, operating state BK of the braking system, input shaft speed $N_{IN}$ ($N_{CO}$), shift lever position $P_{SH}$, and oil temperature $T_{OIL}$ are fed to an electronic engine control device 76 and/or an electronic transmission control device 78.

Figure 4:
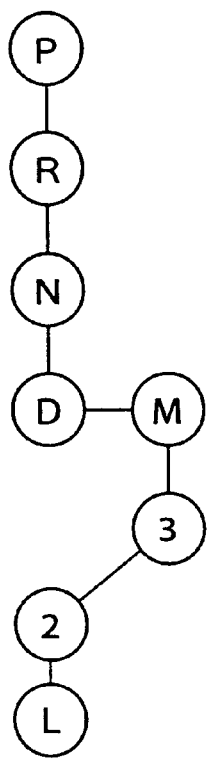
FIG. 4 is a view for explaining the operating positions of a shift lever for the automatic transmission.

As shown in FIG. 4, the shift lever 72 has a PARKING position "P", a REVERSE position "R", a NEUTRAL position "N", and the above-indicated DRIVE position "D", MANUAL position "M", 3RD position "3", 2ND position "2" and LOW position "L", which are arranged in the running or longitudinal direction of the vehicle such that the MANUAL position "M" and the 3RD position "3" are spaced from the position of the straight row of the other positions "P", "R", "N", "D", "2" and "L" in the lateral direction of the vehicle. The shift lever 72 is supported such that the MANUAL position "M" and the 3RD position "3" are selected by moving the shift lever 72 in the lateral direction of the vehicle from the row of the other positions. The shift lever 72 is operatively connected to a manual valve (not shown) incorporated in the hydraulic control circuit 84, so that the manual valve is mechanically operated by the shift lever 72.

Figure 5:
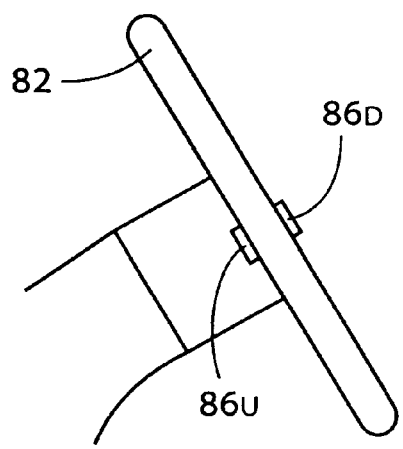
FIG. 5 is a side elevational view of a steering wheel on which are provided shift-up and shift-down switches shown in FIG. 3.

As shown in FIG. 5, a steering wheel 82 provided on the vehicle has a pair of shift-down switches 86D partly exposed on its upper surface such that the switches 86D can be manually depressed in a direction away from the vehicle operator, to shift down the automatic transmission 14, and a pair of shift-up switches 86U partly exposed on its lower surface such that the switches 86U can be manually depressed in a direction toward the vehicle operator, to shift up the automatic transmission 14. These shift-down and shift-up switches 86D, 86U are operable when the transmission control device 78 is placed in a manual shift mode which is established while the shift lever 72 is placed in the MANUAL position "M". In this manual shift mode, the hydraulic control circuit 84 is electrically controlled according to the output signals from the shift-down and shift-up switches 86D, 86U, to shift the automatic transmission 14.

Figure 6:
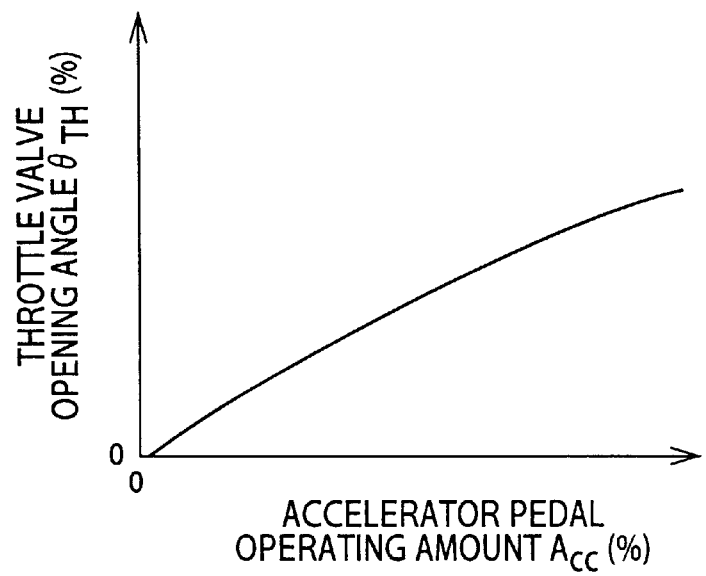
FIG. 6 is a graph showing a relationship between an operating amount $A_{CC}$ of an accelerator pedal and an opening angle $\theta_{TH}$ of a throttle valve, which relationship is a control characteristic of a throttle actuator shown in FIG. 3.

The electronic engine control device 76 shown in FIG. 3 is a so-called microcomputer incorporating a central processing unit (CPU), a random-access memory (RAM), a read-only memory (ROM), and an input and output interface. The CPU operates to process input signals according to control programs stored in the ROM, while utilizing a temporary data storage function of the RAM. The control programs include: a program for controlling a fuel injection 79 for controlling the amount of fuel injection into the engine 10; a program for controlling an ignitor 80 for controlling the ignition timing of the engine 10; a program for controlling the ISC valve 53 for controlling the idling speed of the engine 10; and a program for controlling the throttle actuator 54 for performing a traction control by controlling the output of the engine 10, irrespective of the operating amount $A_{cc}$ of the accelerator pedal 50, so as to prevent excessive slipping of the drive wheels during starting and acceleration of the vehicle. The control programs executed by the engine control device 76 further include a program for controlling the throttle actuator 54 on the basis of the operating amount $A_{cc}$ of the accelerator pedal 50 and according to a predetermined relationship between the operating amount $A_{cc}$ and the opening angle $\theta_{TH}$ of the throttle valve 56. This relationship, which is stored in the ROM, is formulated such that the opening angle $\theta_{TH}$ of the throttle valve 56 increases with an increase in the operating amount $A_{cc}$, as indicated by the graph of FIG. 6, by way of example. The control programs further include a program for controlling the throttle valve 56 to effect an engine output increase control for temporarily increasing the output of the engine 10, for the purpose of improving an acceleration response of the vehicle when the operating amount $A_{cc}$ of the accelerator pedal 50 is increased to accelerate the vehicle during coasting of the vehicle with the automatic transmission 14 placed in the "1st-speed position "1st" which has been selected as a result of a shift-down action of the automatic transmission 14. The engine control device 76 is connected to the transmission control device 78, such that each of these control devices 76, 78 can receive required signals or data from the other control device.

Figure 7:
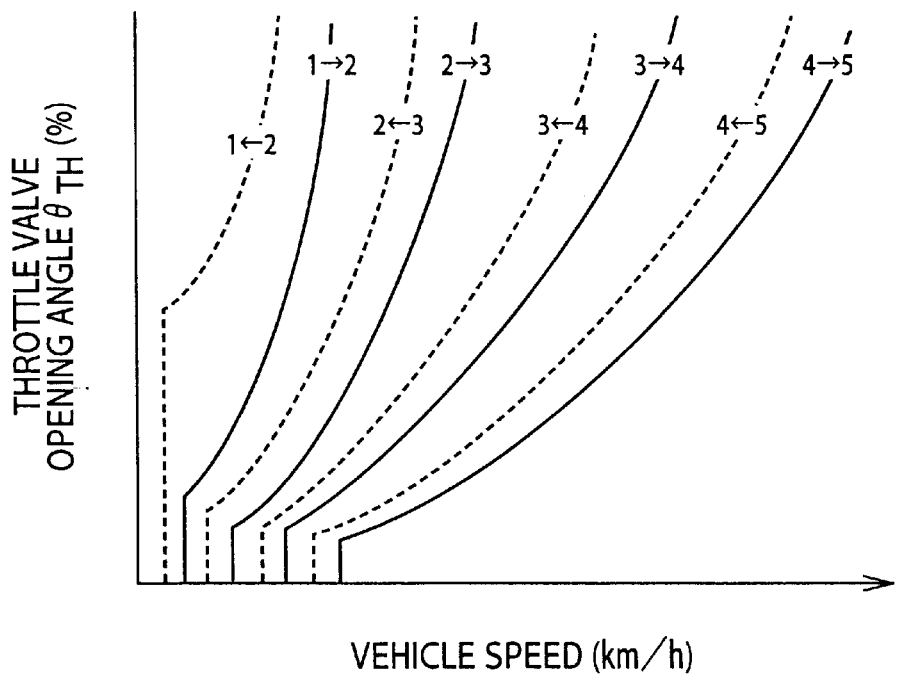
FIG. 7 is a graph showing shift-up and shift-down boundary lines used by an electronic transmission control device shown in FIG. 3, for controlling a shifting operation of the automatic transmission.

Like the engine control device 76, the transmission control device 78 is a so-called microcomputer wherein the CPU operates to process input signals according to control programs stored in the ROM, while utilizing a temporary data storage function of the RAM. The control programs include programs for controlling various solenoid-operated valves and linear solenoid valves SL1, SL2, SL3, SL4, SLU, SLT and SLN incorporated in the hydraulic control circuit 84, to shift the automatic transmission 14 and control the lock-up clutch 24. The automatic transmission 14 is shifted up or down on the basis of the detected opening angle $\theta_{TH}$ of the throttle valve 56 and the detected running speed V of the vehicle, and according to predetermined shift-up and shift-down boundary lines stored in the ROM. As indicated in the graph of FIG. 7, each of these boundary lines represents a relationship between the throttle valve opening angle $\theta_{TH}$ and the vehicle speed V. Whether the automatic transmission 14 should be shifted down or up is determined depending upon a movement of a point defined by the currently detected opening angle $\theta_{TH}$ and speed V, relative to the shift-up and shift-down boundary lines.

The boundary lines used by the transmission control device 78 consist of a 1→2 shift-up line, a 2→3 shift-up line, a 3→4 shift-up line and a 4→5 shift-up lines, which are indicated by solid lines in FIG. 7, and a 2→1 shift-down line, a 3→2 shift-down line, a 4→3 shift-down line and a 5→4 shift-down line, which are indicated by broken lines in FIG. 7 and which are on the lower speed side of the respective shift-up lines. When the vehicle speed V is lowered so as to move across the 2→1 shift-down line while the vehicle is coasting as a result of a movement of the accelerator pedal 50 to its fully released or non-operated position, the transmission control device 78 commands the automatic transmission 14 to be shifted down from the 2nd-speed position "2nd" to the 1st-speed position "1st". It will be understood from the table of FIG. 2 that this shift-down action is effected by placing the clutches C0 and C1 in the engaged state when the shift lever 72 is placed in the DRIVE position "D", or by placing the clutches C0 and C1 and the brake B4 in the engaged state when the shift lever 72 is placed in any one of the engine braking positions indicated above.

The transmission control device 78 functions as the cooperative control apparatus for controlling the engine 10 as well as the automatic transmission 14, so as to control the vehicle such that the control of the engine 10 is coordinated with the control of the automatic transmission 14. Referring to the block diagram of FIG. 8, there will be described various functional means incorporated in the cooperative control apparatus in the form of the transmission control device 78.

Figure 8:
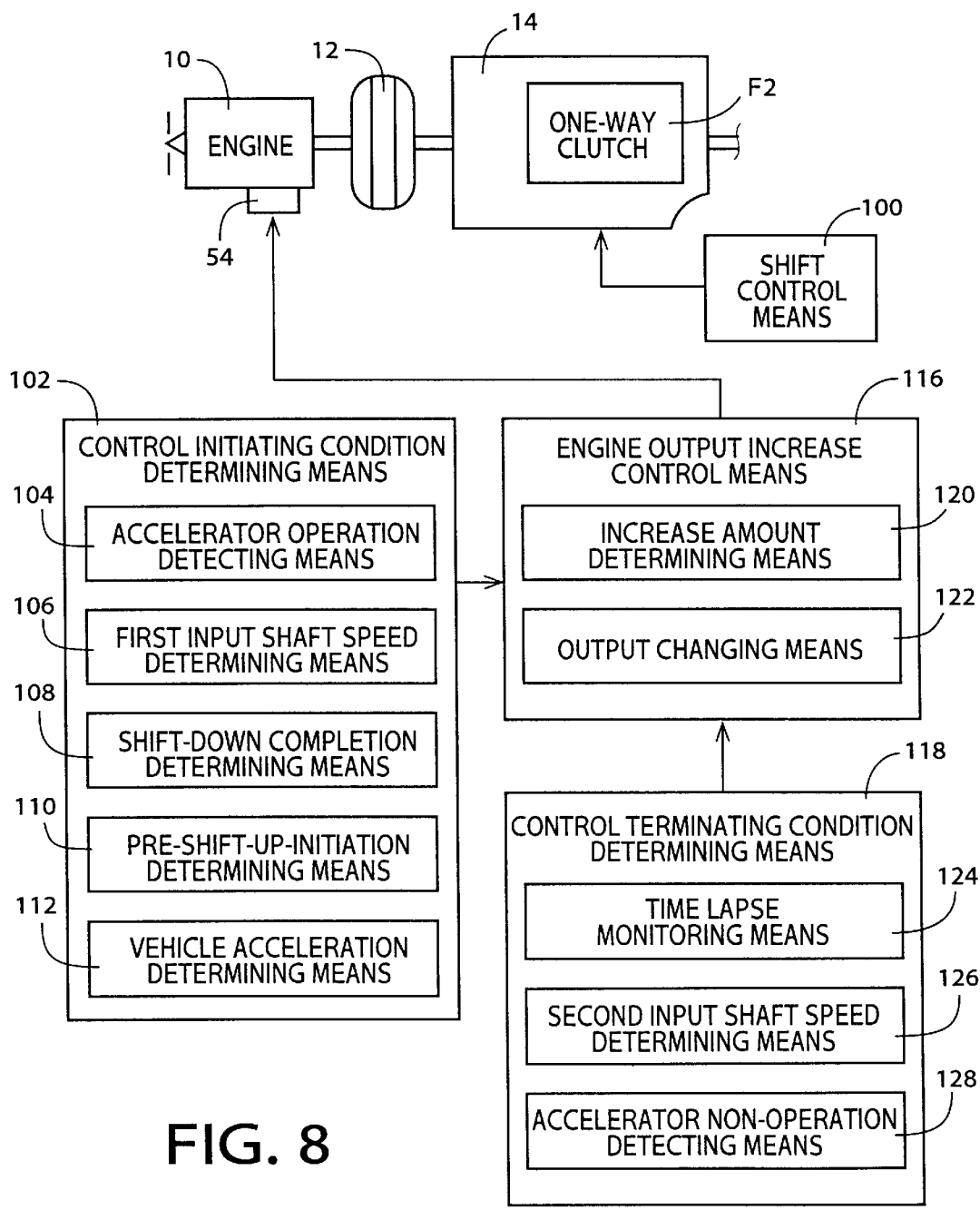
FIG. 8 is a block diagram illustrating functional means incorporated in the transmission control device of FIG. 3 for performing major control functions.

The transmission control device 78 includes shift control means 100, control initiating condition determining means 102, engine output increase control means 116, and control terminating condition determining means 118, as indicated in FIG. 8. The shift control means 100 is adapted to select one of the forward drive positions "1st", "2nd", "3rd", "4th" and "5$^{th}$" of the automatic transmission 14 on the basis of the detected vehicle speed V and the opening angle $\theta_{TH}$ of the throttle valve 56 and according to the stored shift-up and shift-down boundary lines shown in FIG. 7. The opening angle $\theta_{TH}$ of the throttle valve 56 represents the load currently acting on the engine 10, or the output of the engine 10 currently desired by the vehicle operator. In this sense, the opening angle $\theta_{TH}$ used to select the forward drive position of the automatic transmission 14 may be replaced by any other parameters representative of the operator's desired engine output, such as the operating amount $A_{cc}$ of the accelerator pedal 50, the intake air quantity Q and the fuel injection amount. The shift control means 100 controls the hydraulically operated frictional coupling devices (clutches C0–C2, brakes B0–B4, and one-way clutches F0–F2) so as to establish the selected forward drive position of the automatic transmission 14, as indicated in the table of FIG. 2.

For instance, the shift control means 100 controls the clutches C0 and C1, or the clutches C0 and C1 and the brake B4 to effect the 2→1 shift-down action of the automatic transmission 14 when the vehicle speed V is lowered so as to move across the 2→1 shift-down line while the vehicle is coasting as a result of a fully releasing operation of the accelerator pedal 50 to its non-operated position. As explained above, the 2→1 shift-down action is effected by placing the clutches C0 and C1 in the engaged state when the shift lever 72 is placed in the DRIVE position "D", or by placing the clutches C0 and C1 and the brake B4 in the engaged state when the shift lever 72 is placed in any engine braking position. In the engine braking position, the brake B4 is engaged for the purpose of inhibiting slipping of the one-way clutch F2.

The control initiating condition determining means 102 is operated during coasting of the vehicle with the automatic transmission 14 placed in the 1st-speed position and with the one-way clutch F2 placed in the released state. The control initiating condition determining means 102 determines whether a control initiating condition for initiating the engine output increase control indicated above (an engine output increase control routine illustrated in the flow chart of FIG. 10) is satisfied. Described in detail, the control initiating condition determining means 102 determines that the control initiating condition is satisfied when all of the following five conditions (1)–(5) have been satisfied:

(1) a condition that the accelerator pedal 50 has been depressed to accelerate the vehicle;

(2) a condition that the input shaft speed NC0 of the automatic transmission 14 is lower than a calculated value ($N_{OUT} \times \gamma 1 - C$), where "$N_{OUT}$" represents the output shaft speed of the automatic transmission 14, "$\gamma 1$" represents the speed ratio of the 1st-speed position "1st" of the automatic transmission (i.e., $N_{CO}/N_{OUT}$ during vehicle running with the engine output), and "C" represents a predetermined first constant;

(3) a condition that the shift-down action of the automatic transmission 14 to the 1st-speed position (from the 2nd-speed, 3rd-speed, 4th-speed or 5th-speed position "2nd", "3rd", "4th", "5th") has been completed with a predetermined time having passed after the moment of generation of the shift-down command, namely, a condition that the frictional coupling device B3, B2, C2 or B0 which should be released to effect the shift-down action has been completely or fully released;

(4) a condition that if the automatic transmission 14 has been shifted up from the 1st-speed position "1st" after the shift-down action to this position "1st", this shift-up action has not been substantially initiated or effected, immediately after the moment of generation of the shift-up command, that is, the frictional coupling device which should be engaged to effect the shift-up action has not been engaged to such an extent that permits the frictional coupling device to have a torque capacity; and (5) a condition that an acceleration value dV/dt of the vehicle is lower than a predetermined lower limit.

To determine whether the conditions (1)–(5) have been satisfied or not, the control initiating condition determining means 102 incorporates accelerator operation detecting means 104, first input shaft speed determining means 106, shift-down completion determining means 108, pre-shift-up-initiation determining means 110, and vehicle acceleration determining means 112. The accelerator operation detecting means 104 is arranged to determine whether the accelerator pedal 50 has been depressed to accelerate the vehicle during coasting of the vehicle with the automatic transmission 14 placed in the 1st-speed position "1st". This determination is effected on the basis of the detected operating amount $A_{CC}$ of the accelerator pedal 50, the detected opening angle $\theta_{TH}$ of the throttle valve 56 or the output signal of the idling detector switch of the throttle sensor 64.

The first input shaft speed determining means 106 is arranged to detect the input shaft speed $N_{CO}$ of the automatic transmission 14 from time to time, and determine whether the detected input shaft speed $N_{CO}$ is lower than the above-indicated value ($N_{OUT} \times \gamma 1 - C$). The shift-down completion determining means 108 is arranged to determine whether the shift-down action of the automatic transmission 14 to the 1st-speed position has been completed with a predetermined time having passed after the moment of generation of the shift-down command, namely, whether the frictional coupling device B3, B2, C2 or B0 which should be released to effect the shift-down action has been completely or fully released. The pre-shift-up-initiation determining means 110 is arranged to determine whether the shift-up action from the 1st-speed position "1st" has not been substantially initiated, immediately after the moment of generation of the shift-up command, that is, whether the frictional coupling device which should be engaged to effect the shift-up action has not been engaged to such an extent that permits the frictional coupling device to have a torque capacity. The vehicle acceleration determining means 112 is arranged to determine whether the acceleration value dV/dt of the vehicle is lower than the predetermined lower limit. If it is determined that all of these five conditions are satisfied, the control initiating condition determining means 102 determines that the control initiating condition has been satisfied.

The engine output increase control means 116 is operated when the control initiating condition determining means 102 has determined that the control initiating condition has been satisfied. The engine output increase control means 116 is arranged to activate the throttle actuator 54 through the engine control device 76, so as to increase the opening angle $\theta_{TH}$ of the throttle valve 56, until the control terminating condition determining means 118 has determined that a control terminating condition for terminating the engine output increase control has been satisfied. With this engine output increase control by the engine output increase control means 116, the output of the engine 10 is made larger than when the control initiating condition is not-satisfied. A maximum amount $\Delta\theta_{TH}$ of increase of the opening angle $\theta_{TH}$ (which corresponds to a maximum amount D of increase of the engine output) and a maximum increase period A during which the opening angle $\theta_{TH}$ is increased are predetermined so as to reduce a delay in a response to the operation of the accelerator pedal 50 to accelerate the vehicle during its coasting run following the shift-down-action of the automatic transmission 14 to the 1st-speed position "1st". Described more specifically, the maximum increase amount $\Delta\theta_{TH}$ and the maximum increase period A are predetermined (a) so that the input shaft speed $N_{CO}$ of the automatic transmission 14 in the process of increase of the opening angle $\theta_{TH}$ does not exceed the synchronizing speed ($N_{OUT} \times \gamma 1$), (b) so that the output of the engine 10 is kept increased with an increase in the opening angle $\theta_{TH}$, while the input shaft speed $N_{CO}$ after the shift-down action to the 1st-speed position "1st" is not higher than the synchronizing speed ($N_{OUT} \times \gamma 1$) of the 1st-speed position "1st" of the automatic transmission 14, that is, until the input shaft speed $N_{CO}$ has been raised to a value close to the synchronizing speed, and (c) so that the opening angle $\theta_{TH}$ (engine output) is increased (by an amount up to the maximum amount $\Delta\theta_{TH}$) at a predetermined suitable rate and is reduced at a predetermined suitable rate from the increased value to the original value.

Figure 9:
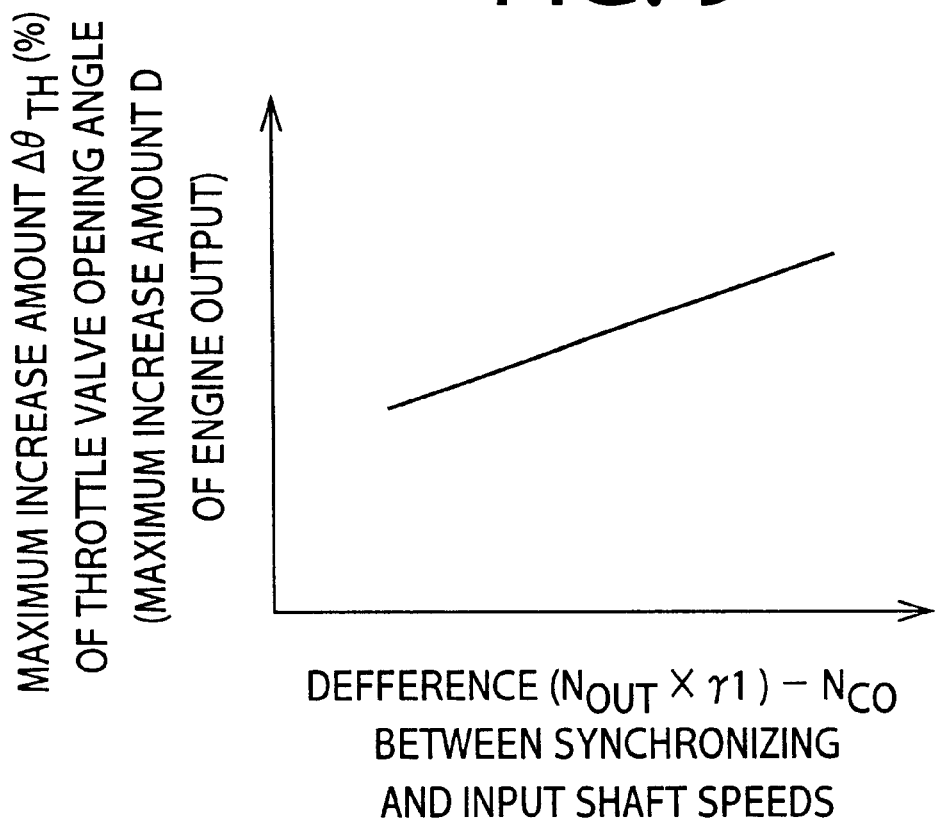
FIG. 9 is a graph indicating a relationship used by engine output increase determining means of the transmission control device to determine a maximum amount of increase of the opening angle of the throttle valve.

The engine output increase control means 116 includes increase amount determining means 120 and output changing means 122. The increase amount determining means 120 is arranged to determine the maximum amount $\Delta\theta_{TH}$ of increase of the opening angle $\theta_{TH}$ of the throttle valve 56 on the basis of a difference between the synchronizing speed ($N_{OUT} \times \gamma 1$) of the 1st-speed position "1st" and the input shaft speed $N_{CO}$ during the vehicle coasting, and according to the predetermined relationship between the maximum increase amount $\Delta\theta_{TH}$ and the difference $(N_{OUT} \times \gamma 1) - N_{CO}$. This relationship, which is stored in the ROM of the transmission control device 78, is determined such that the maximum increase amount $\Delta\theta_{TH}$ increases with an increase in the difference, as shown in FIG. 9. The output changing means 122 is arranged to increase the opening angle $\theta_{TH}$ at the predetermined rate by an amount up to the maximum amount $\Delta\theta_{TH}$, hold the opening angle $\theta_{TH}$ at the increased value ($\theta TH + \Delta\theta_{TH}$), for a given time, and reduce the opening angle $\theta_{TH}$ at the predetermined rate after the control terminating condition determining means 118 has determined that the control terminating condition has been satisfied. Thus, the output of the engine 10 is increased by an amount up to the maximum amount D corresponding to the maximum amount $\Delta\theta_{TH}$. The increase of the opening angle $\theta_{TH}$ is terminated even before it is increased by the maximum amount $\Delta\theta_{TH}$, if the control terminating condition is satisfied before the opening angle $\theta_{TH}$ has been increased by the maximum amount $\Delta\theta_{TH}$ to a maximum value max($\theta_{TH}$, $\Delta\theta_{TH}$). The rates at which the opening angle $\theta_{TH}$ is increased and reduced by the output changing means 122 are determined so that an exhaust gas processing device provided for the engine 10 will not be overloaded due to a change in the intake air quantity during a change in the opening angle $\theta_{TH}$.

The control terminating condition determining means 118 includes time lapse monitoring means 124, second input shaft speed determining means 126 and accelerator non-operation detecting means 128. The time lapse monitoring means 124 is arranged to determine whether a time $T_{EL}$ after the moment of initiation of the engine output increase control by the engine output increase control means 116 to increase the output of the engine 10 has exceeded a predetermined threshold, that is, the predetermined maximum increase period A indicated above. The second input shaft speed determining means 126 is arranged to determine whether the input shaft speed $N_{CO}$ of the automatic transmission 14 has been raised above a value $\{(N_{OUT} \times \gamma 1) - B\}$, where "B" represents a predetermined second constant smaller than the above-indicated first constant C. The accelerator non-operation detecting means 128 is arranged to determine whether the accelerator pedal 50 has been returned to the non-operated position. If any one of these means 124, 126, 128 obtains an affirmative decision, the control terminating condition determining means 118 determines that the control terminating condition has been satisfied. In this case, the engine output increase control means 116 terminates the engine output increase control. In other words, the engine output increase control means 116 continues the engine output increase control until the control terminating condition determining means 118 has determined that the control terminating condition has been satisfied.

Figure 10:
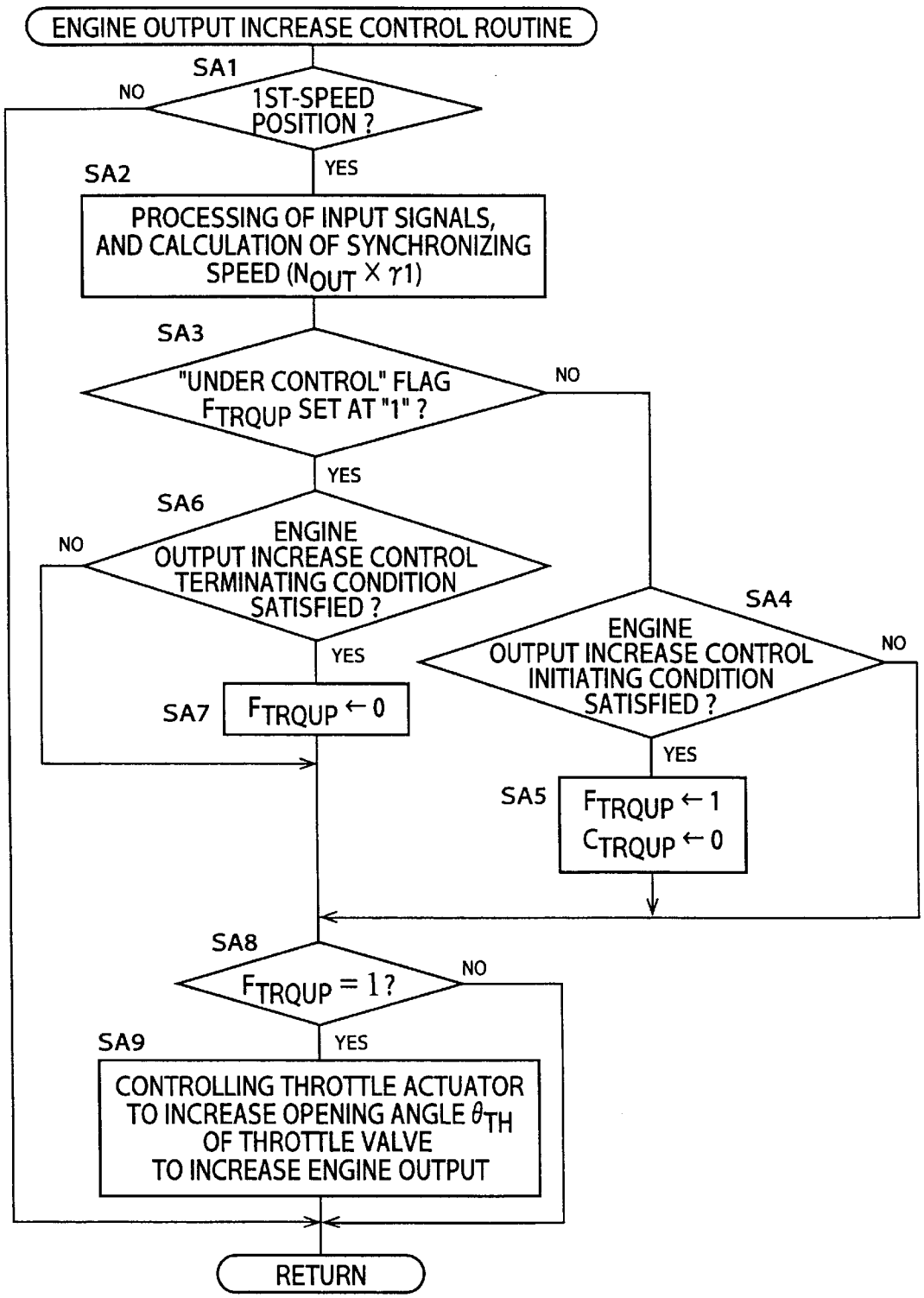
FIG. 10 is a flow chart illustrating an engine output increase control routine executed by the transmission control device of FIG. 3.

Referring next to the flow chart of FIG. 10, there will be described the engine output increase control routine which is executed by the transmission control device 7 to temporarily increase the output (torque) of the engine 10 for the purpose of improving the drivability of the vehicle upon an operation of the accelerator pedal 50 to accelerate the vehicle during coasting of the vehicle with the shift lever 72 placed in the DRIVE position "D".

The engine output increase control routine of FIG. is initiated with step SA1 to determine whether the vehicle is running with the automatic transmission 14 placed in the 1st-speed position "1st". If a negative decision (NO) is obtained in step SA1, one cycle of execution of the present routine is terminated. If an affirmative decision (YES) is obtained in step SA1, the control flow goes to step SA2 to read in and process various input signals received from the various sensors, and calculate the synchronizing speed ($N_{OUT} \times \gamma 1$) of the 1st-speed position "1st", on the basis of the detected output shaft speed $N_{OUT}$ and the speed ratio $\gamma 1$ of the 1st-speed position "1st".

Step SA2 is followed by step SA3 to determine whether an UNDER CONTROL flag $F_{TRQUP}$ indicating that the engine output increase control is being effected is set at "1" or not. In the first cycle of execution of the routine of FIG. 10, a negative decision (NO) is obtained in step A3, and the control flow goes to step SA4 which corresponds to the control initiating condition determining means 102 described above. An affirmative decision (YES) is obtained in step SA4 when all of the five conditions (1)–(5) described above have been satisfied.

Figure 11:
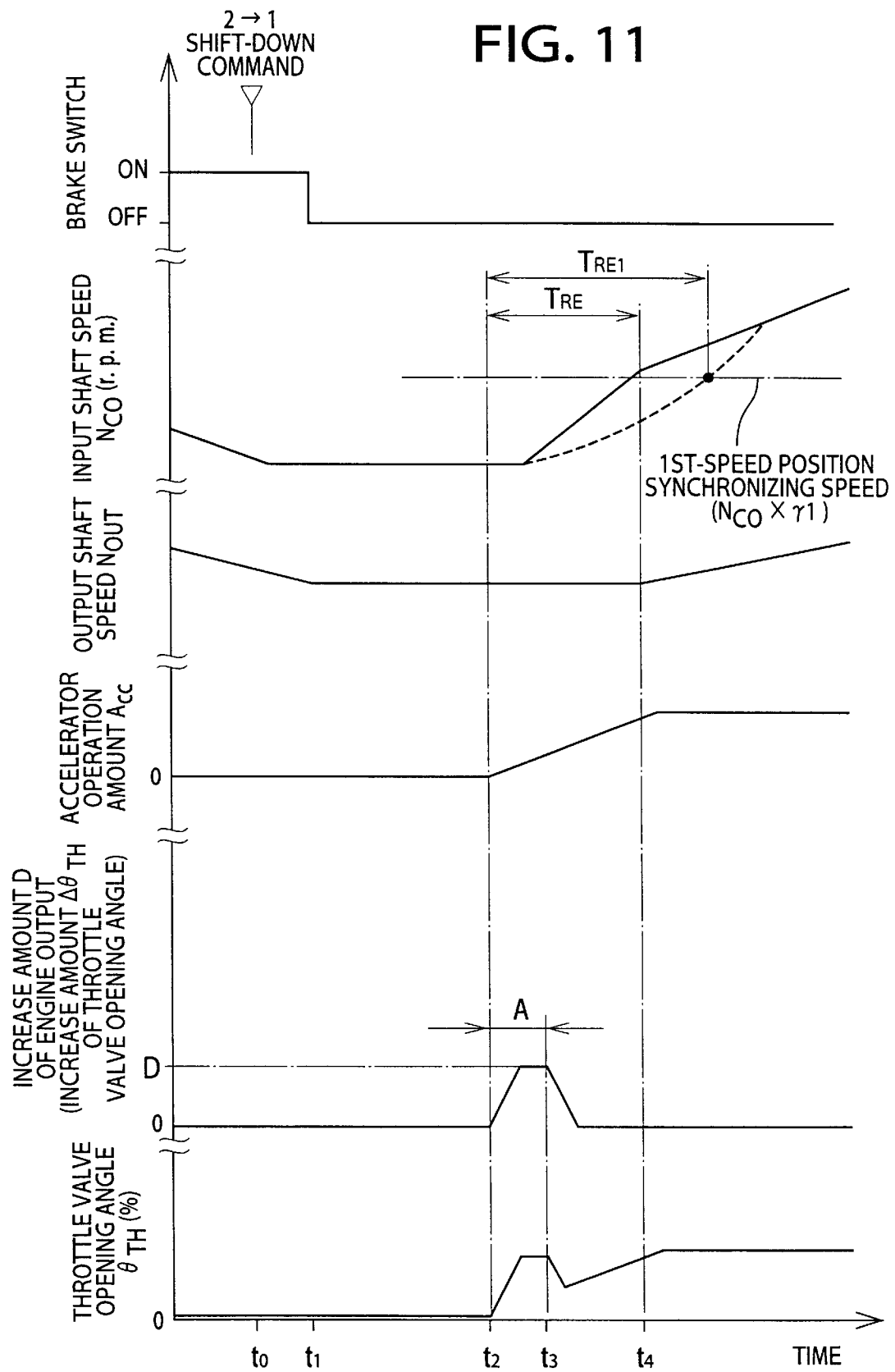
FIG. 11 is a time chart for explaining an operation of the vehicle controlled according to the engine output increase control routine of the flow chart of FIG. 10.

Initially, a negative decision (NO) is obtained in step SA4, and the control flow goes to step SA8 to determine whether the UNDER CONTROL flag $F_{TRQUP}$ is set at "1". Initially, a negative decision (NO) is obtained in step SA8, and one cycle of execution of the routine is terminated. The negative decision (NO) is obtained step SA8 up to a point of time t2 indicated in FIG. 11. In the specific example of FIG. 11, the brake pedal is held depressed to apply a brake to the vehicle with the accelerator pedal 50 held in the non-operated position. At a point of time t0 in FIG. 11, the shift-down command to shift down the automatic transmission 14 from the 2nd-speed position "2nd" to the 1st-speed position "1st" is generated by the shift control means 100 as a result of a drop of the running speed V of the vehicle. During a time period between t1 and t2, the vehicle is running in a coasting mode with the one-way clutch F2 held in the released state, with neither an engine torque or power being transmitted to the drive wheels through the automatic transmission 14, nor a kinetic energy being transmitted from the drive wheels to the engine 10 through the automatic transmission 14, namely, without an engine brake being applied to the vehicle.

If an affirmative decision (YES) is obtained in step SA4, the control flow goes to step SA5 to set the UNDER CONTROL flag $F_{TRQUP}$ to "1" and clear a time counter $C_{TRQUP}$ which measures a time after the affirmative decision (YES) is obtained in step SA4, that is, after the moment of initiation of the engine output increase control. Step SA5 is followed by step SA8. In this case wherein the UNDER CONTROL flag $F_{TRQUP}$ is set at "1", an affirmative decision (YES) is obtained in step SA8, and the control flow goes to step SA9 to generate an engine output increase command for activating the engine output increase control means 116 to increase the output of the engine 10. Namely, the maximum increase amount $\Delta\theta_{TH}$ of the opening angle $\theta_{TH}$ of the throttle valve 56 to obtain the maximum increase amount D of the engine output is determined on the basis of the difference between the synchronizing speed ($N_{OUT} \times \gamma 1$) of the 1st-speed position "1st" calculated in step SA2, and the currently detected input shaft speed $N_{CO}$ (during coasting of the vehicle), and according to the stored predetermined relationship of FIG. 9 between the difference and the maximum increase amount $\Delta\theta_{TH}$. Then, the increase of the opening angle $\theta_{TH}$ is initiated. The opening angle $\theta_{TH}$ is increased at the predetermined rate. The maximum increase amount $\Delta\theta_{TH}$ is determined only when step SA9 is implemented for the first time.

When the next cycle of execution of the routine is executed, an affirmative decision (YES) is obtained in step SA3, and the control flow goes to step SA6 which corresponds to the control terminating condition determining means 118 described above. An affirmative decision (YES)

is obtained in step SA6, namely, the control terminating condition is satisfied, when any one of the time lapse monitoring means 124, second input shaft speed determining means 126 and the accelerator non-operation detecting means 128 has obtained the affirmative decision.

When step SA6 is implemented for the first time, a negative decision (NO) is obtained, and the control flow goes to step SA9 through step SA8. Steps SA1, SA2, SA3, SA6, SA8 and SA9 are repeatedly implemented to continuously increase the opening angle $\theta_{TH}$ of the throttle valve 56 by controlling the throttle actuator 54, to thereby increase the engine output, until the affirmative decision (YES) is obtained in step SA6. If the opening angle $\theta_{TH}$ has been increased by the predetermined maximum amount $\Delta\theta_{TH}$ determined in step SA9 when this step was implemented for the first time, that is, if the opening angle $\theta_{TH}$ has been increased to the maximum value max($\theta_{TH}$, $\Delta\theta_{TH}$) corresponding to the maximum increase amount D of the engine output, before the maximum increase period A has passed, the opening angle $\theta_{TH}$ is held at the maximum value max($\theta_{TH}$, $\Delta\theta_{TH}$) for the remaining time. Thus, the opening angle $\theta_{TH}$ is normally increased and held by repeated implementation of step SA9, during the maximum time period A, which is a period between the point of time t2 and a point of time t3 indicated in FIG. 11.

As described above, the control terminating condition is satisfied (affirmative decision is obtained in step SA6) when the time $T_{EL}$ after the moment of initiation of the engine output increase control has exceeded the predetermined threshold A (maximum increase period A), or when the input shaft speed $N_{CO}$ has been raised above the predetermined value $\{(N_{OUT}\times\gamma 1)-B\}$, or when the accelerator pedal 50 has been returned to the non-operated position. In the latter two cases, the engine output increase control is usually terminated before the maximum increase period A has expired. When the affirmative decision (YES) is obtained in step SA6, the control flow goes to step SA7 to reset the UNDER CONTROL flag $F_{TRQUP}$ to "0", and to step SA8. In this case, a negative decision (NO) is obtained in step SA8, and the engine output increase control is terminated.

The maximum increase period A (threshold of the time $T_{EL}$ which has passed after the moment of initiation of the engine output increase control) is determined so that the output of the engine 10 is increased during an engine output increase period TRE in which the input shaft speed Nco of the automatic transmission 14 is lower than the synchronizing speed ($N_{OUT}\times\gamma 1$), that is, until the input shaft speed $N_{CO}$ has been raised to the synchronizing speed. The period $T_{RE}$ expires at a point of time t4 indicated in FIG. 11. The thus determined maximum increase period A of the throttle opening angle $\theta_{TH}$ assures not only an improved response to an operation of the accelerator pedal 50 during a costing run of the vehicle, but also prevention of a shock given to the automatic transmission 14 due to the temporary increase of the engine output when the input shaft speed $N_{CO}$ has been raised to the synchronizing speed ($N_{OUT}\times\gamma 1$). Further, the maximum increase amount $\Delta\theta_{TH}$ of the throttle opening angle $\theta_{TH}$ (maximum increase amount D of the engine output) is determined on the basis of the difference $\{(N_{OUT}\times\gamma 1)-N_{CO}\}$ and according to the relationship of FIG. 9, so that the input shaft speed $N_{CO}$ will not exceed the synchronizing speed ($N_{OUT}\times\gamma 1$) in the process of increase of the throttle opening angle $\theta_{TH}$, namely, so as to prevent the above-indicated shock of the automatic transmission 14.

The predetermined first constant C used in step SA4 is determined to determine whether the difference $\{(N_{OUT}\times\gamma 1)-N_{CO}\}$ is so large that the engine output increase control (increase of the throttle opening angle $\theta_{TH}$) implemented in step SA9 is effective enough to improve the acceleration performance of the vehicle upon an operation of the accelerator pedal 50 during vehicle coasting. This value C is determined by experimentation. In this respect, it is noted that the engine output increase control would not be so effective to improve the acceleration performance if it were effected when the input shaft speed $N_{CO}$ is relatively close to the synchronizing speed ($N_{OUT}\times\gamma 1$), namely, when the difference $\{(N_{OUT}\times\gamma 1)-N_{CO}\}$ is smaller than the predetermined first constant C. In this condition, the vehicle can be accelerated with a satisfactory response, and it is not necessary to effect the engine output increase control, which may induce an undesirable shock to the automatic transmission 14 when the input shaft speed $N_{CO}$ has been raised to the synchronizing speed.

On the other hand, the predetermined second constant B used in step SA6 is determined to detect a vehicle condition in which the input shaft speed $N_{CO}$ is only slightly lower than the synchronizing speed ($N_{OUT}\times\gamma 1$), and in which the engine output increase control in step SA9 may create an undesirable state such as a shock given to the automatic transmission 14 upon synchronization.

As described above, the output of the engine 10 is temporarily increased when the accelerator pedal 50 is operated to accelerate the vehicle during coasting of the vehicle with the automatic transmission 14 placed in the 1st-speed position "1st" and with the shift lever 72 placed in the DRIVE position "D". As a result, the input shaft speed Nco of the automatic transmission 14 which is initially considerably lower than the synchronizing speed ($N_{OUT}\times\gamma 1$) of the 1st-speed position "1st" is more rapidly raised as indicated by solid line in FIG. 11, than in the prior art arrangement wherein the engine output control is not effected, as indicated by broken line in the same figure. Accordingly, the input shaft speed $N_{CO}$ can be raised to the synchronizing speed ($N_{OUT}\times\gamma 1$) in a shorter length of time as indicated by the engine output increasing period $T_{RE}$ which expires at the point of time t4. At this point of time t4, the one-way clutch F2 is fully engaged to inhibit racing of the ring gear R3, so that the automatic transmission 14 which has been placed in the power disconnecting state is placed in the power transmitting state, for thereby accelerating the vehicle with the engine output. Thus, the vehicle acceleration response time as expressed by the engine output increasing period $T_{RE}$ is made significantly shorter than a response time $T_{RE1}$ according to the prior art arrangement.

In the present embodiment which has been described, the output of the engine 10 is increased when the control initiating condition determining means 102 (step SA4) determines that the engine output increase initiating condition has been satisfied as a result of an operation of the accelerator pedal 50 during coasting of the vehicle with the one-way clutch F2 held in the released state. Namely, the engine output is made larger than when the determining means 102 does not determine that the engine output increase control initiating condition has been satisfied. Accordingly, the time $T_{RE}$ required for the input shaft speed $N_{CO}$ of the automatic transmission 14 to be raised to the synchronizing speed ($N_{OUT}\times\gamma 1$) can be reduced, so that the time required for the automatic transmission 14 to be able to transmit a power to accelerate the vehicle by engagement of the one-way clutch F2 can be accordingly reduced, resulting in an improved degree of drivability of the vehicle as felt by the vehicle operator.

The present embodiment is further advantageous in that the engine output increase control means 116 (SA9) is arranged to increase the opening angle $\theta_{TH}$ of the throttle valve 56 for increasing the output of the engine 10, so as to prevent the input shaft speed $N_{CO}$ from exceeding the synchronizing speed ($N_{OUT} \times \gamma 1$) which is a product of the output shaft speed $N_{OUT}$ and the speed ratio $\gamma 1$ of the 1st-speed position "1st" in which the automatic transmission 14 is actually placed during the vehicle coasting. Accordingly, the rate of increase of the input shaft speed $N_{CO}$ will not be suddenly lowered upon engagement of the one-way clutch F2, so that an engaging shock of the one-way clutch F2 can be suitably eliminated.

The present embodiment is also advantageous in that the engine output increase control means 116 (step SA9) is arranged to increase the throttle opening angle $\theta_{TH}$ so that the output of the engine 10 is increased until the input shaft speed $N_{CO}$ of the automatic transmission 14 has been raised to the synchronizing speed ($N_{OUT} \times \gamma 1$) of the 1st-speed position "1st". Therefore, the input shaft speed $N_{CO}$ can be rapidly raised by an optimum amount, that is, raised to a level sufficiently close to the synchronizing speed ($N_{OUT} \times \gamma 1$), so as to effectively improve the vehicle accelerating response.

The present embodiment has a further advantage of avoiding an unnecessary operation to increase the engine output, and assuring the initiation of the engine output increase control shortly before the input shaft speed $N_{CO}$ of the automatic transmission 14 has reached the synchronizing speed ($N_{OUT} \times \gamma 1$), so that an engaging shock of the automatic transmission 14 can be suitably prevented. Namely, the control initiating condition determining means 102 (SA4) is arranged to determine that the control initiating condition is satisfied, only when the input shaft speed $N_{CO}$ is lower than the synchronizing speed ($N_{OUT} \times \gamma 1$) minus the predetermined first constant C, and the engine output increase control means 116 (SA9) is arranged to increase the output of the engine 10 as long as the control initiating condition determining means 102 determines that the control initiating condition is satisfied. Accordingly, the engine output increase control is not effected while the input shaft speed Nco is higher than the synchronizing speed ($N_{OUT} \times q1$) minus the predetermined first constant C.

The present embodiment is further advantageous in that the control initiating condition determining means 102 (SA4) is arranged to determine that the control initiating condition is satisfied, only when the 2→1 shift-down action of the automatic transmission 14 has been substantially completed. That is, the initiation of the engine output increase control is avoided when the brake B3, B2, or clutch C2 or brake B0 which should be engaged to complete the 2→1, 3→1, 4→1 or 5→1 shift-down action is still partially released or or slipping.

The present embodiment is further advantageous in that the control initiating condition determining means 102 (SA4) is arranged to determine that the control initiating condition is satisfied, only when the shift-up action from the 1st-speed position "1st" following the shift-down action to the 1st-speed position "1st" has not been substantially initiated, namely, only when the brake B3 which should be engaged to effect the shift-up action to the 2nd-speed position "2nd" has not been substantially engaged. According to this arrangement, the engine output increase control is effected even after the generation of a command to shift-up the automatic transmission from the 1st-speed position "1st", until the frictional coupling coupling device in the form of the brake B3 has been substantially engaged. In other words, the engine output increase control is not continued after the brake B3 has been substantially engaged.

The present embodiment is also advantageous in that the control initiating condition determining means 102 (SA4) is arranged to determine that the control initiating condition is satisfied, only while the acceleration value of the vehicle is lower than the predetermined lower limit. Thus, the present arrangement prevents the engine output increase control after the vehicle has been sufficiently accelerated, for some reason or other.

The present embodiment is further adapted to continue the engine output increase control until the control terminating condition 116 (SA6) determines that the control terminating condition is satisfied. The control terminating condition 116 is arranged to determine that the control terminating condition is satisfied, when the time lapse after the moment of initiation of the engine output increase control has exceeded the predetermined maximum increase period A, and/or when the input shaft speed $N_{CO}$ of the automatic transmission 14 has been raised above the synchronizing speed ($N_{OUT} \times \gamma 1$) minus the predetermined second constant B, and/or when the accelerator pedal 50 has been returned to the fully released or non-operated position. Thus, the engine output increase control is restricted in terms of the time period of the increase and the input shaft speed $N_{CO}$, and is prevented when the vehicle operator does not have an intention to accelerate the vehicle after the automatic transmission 14 has been shifted down to the 1st-speed position "1st".

The present embodiment is also advantageous in that the engine output increase control means 116 is arranged to increase the output of the engine 10 by an amount up to the maximum amount D at a predetermined suitable rate, hold the engine output at the increased value for a predetermined time (before expiration of the maximum increase period A), and reduce the engine output at a predetermined suitable rate after the control terminating condition determining means 118 has determined that the control terminating condition is satisfied. This arrangement is effective to avoid an abrupt increase or decrease in the intake air quantity Q of the engine 10, thereby preventing an increase in the concentration of noxious gases in the exhaust emission. This arrangement is particularly effective where the engine 10 has a relatively large displacement, and a high tendency of air intake delay.

Further, the engine output increase control means 116 includes the increase amount determining means 120 arranged to increase the maximum increase amount D with an increase in the difference $\{(N_{OUT} \times \gamma 1) - N_{CO}\}$ between the calculated synchronizing speed ($N_{OUT} \times \gamma 1$) and the detected input shaft speed $N_{CO}$, according to the predetermined stored relationship of FIG. 9, so that the output of the engine 10 is increased by an amount up to the determined maximum increase amount D determined by the increase amount determining means 120. Accordingly, the engine output is increased by an appropriate amount corresponding to the difference $\{(N_{OUT} \times \gamma 1) - N_{CO}\}$, to assure a sufficiently high degree of accelerating response of the vehicle while avoiding a shock of the automatic transmission 14 upon engagement of the one-way clutch F2.

While the presently preferred embodiment of this invention has been described above by reference to the drawings, it is to be understood that the invention may be otherwise embodied.

For instance, the first embodiment wherein the engine output is increased during vehicle coasting with the automatic transmission 14 is placed in the 1st-speed position "1st" may be modified so as to effect the engine output increase control during vehicle coasting while the automatic transmission 14 is placed in the 2nd-speed or higher speed forward drive position.

In the first embodiment, the one-way clutch F2 functions as a frictional coupling device which is released during vehicle coasting with the automatic transmission 14 placed in the 1st-speed position "1st", to place the automatic transmission 14 in the power disconnecting state. However, the one-way clutch F2 may be replaced by a hydraulically operated brake or clutch which is adapted to be released during vehicle coasting.

Figure 12:
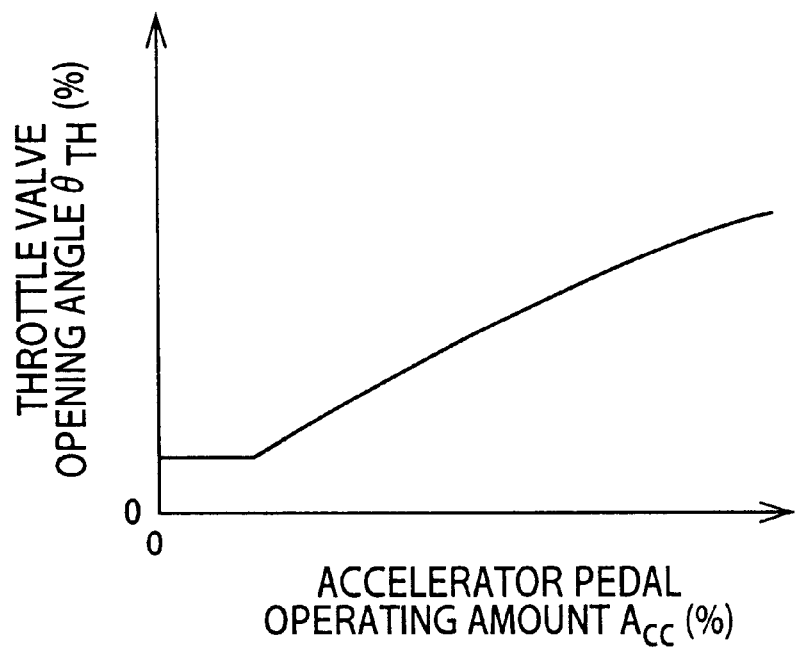
FIG. 12 is a graph indicating a relationship between the throttle valve opening angle and the accelerator pedal operating amount, which is selected to control the throttle actuator for increasing the engine output, according to another embodiment of this invention.

In the first embodiment, the engine output increase control means 116 is adapted to temporarily increase the output of the engine 10 by controlling the throttle actuator 54 as described above. However, the engine output increase control means may be adapted to increase the engine output by controlling the throttle actuator 54 according to an engine output increase relationship between the opening angle $\theta_{TH}$ of the throttle valve 56 and the operating amount $A_{CC}$ of the accelerator pedal 50, upon an operation of the accelerator pedal 50 during vehicle coasting, in place of the normal relationship of FIG. 6. An example of the engine output increase relationship used in this modified embodiment is shown in the graph of FIG. 12. The relationship of FIG. 12 is formulated such that the throttle opening angle $\theta_{TH}$ is held constant at a predetermined value larger than zero, while the operating amount $A_{CC}$ of the accelerator pedal 50 is within a range between zero and a predetermined value. By changing the relationship from that of FIG. 6 to that of FIG. 12, the engine output is temporarily increased when the accelerator pedal 50 is operated from the non-operated position to accelerate the vehicle during coasting of the vehicle.

While the embodiments of FIGS. 1–11 and FIG. 12 use the throttle valve 56 to temporarily increase the output of the engine 10, the ISC valve 53 or the fuel injection valve 79 may be used to effect the engine output increase control according to the present invention. Alternatively, the engine output can be increased by temporarily reducing the load acting on the engine 10, for instance, by releasing a clutch which is engaged to connect an air conditioner compressor or any other optionally operated device to the engine 10. Where the drive power source provided on the vehicle is a hybrid drive source including an electric motor and an engine, or consists of only an electric motor, the output of the electric motor may be temporarily increased upon an operation of the accelerator pedal 50 during coasting of the vehicle with the automatic transmission 14 placed in the 1st-speed or other forward drive position.

The engine output increase control means 116 in the illustrated embodiments is adapted to determine the maximum increase amount D such that the maximum increase amount D increases with an increase in the difference $\{(N_{OUT} \times \gamma 1) - N_{CO}\}$ according to the predetermined relationship of FIG. 9. However, the engine output increase control may be effected according to the principle of this invention even where the maximum increase amount is a predetermined constant value.

In the illustrated embodiments, the engine output increase control is effected during coasting of the vehicle following the 2→1 shift-down action of the automatic transmission 14 with the shift lever 72 placed in the DRIVE position "D", wherein an engine brake is not applied to the vehicle. The engine output increase control according to the present invention may be effected in any other coasting condition of the vehicle following the 2→1, 3→1, 4→1 or 5→1 shift-down action which takes place with the shift lever 72 placed in the other position or as a result of a manual shifting of the automatic transmission 14 and which does not cause an engine brake application to the vehicle.

Although the control initiating condition determining means 102 is arranged to determine that the control initiating condition is satisfied, when all of the five conditions (1)–(5) described above have been satisfied, the determining means 102 may be modified to determine that the control initiating condition is satisfied, when at least one of those five conditions (1)–(5) has been satisfied, or when any other condition or conditions has/have been satisfied.

While the automatic transmission 14 in the illustrated embodiments has the five forward drive positions, it may have less than or more than five forward drive positions, or instance four or six forward drive positions. Although the electronic transmission control device 78 is assigned to execute the engine output increase control routine illustrated in the flow chart of FIG. 10, the electronic engine control device 76 or a computer independent of the transmission and engine control devices 76, 78 may be assigned to effect the engine output increase control according to the present invention.

It is to be understood that the present invention may be embodied with various other changes, modifications and improvements, which may occur to those skilled in the art, without departing from the spirit and scope of the invention defined in the following claims.

What is claimed is:

1. A cooperative control apparatus for controlling an automotive vehicle, so as to effect a cooperative control of an automatic transmission and a drive power source which produces an output to drive the vehicle through said automatic transmission, said automatic transmission incorporating a frictional coupling device which is engaged to place said automatic transmission in a power transmitting state, during power driving of the vehicle with the output of said drive power source, and is released to place said automatic transmission in a power disconnecting state, during coasting of the vehicle, said cooperative control apparatus comprising:

control initiating condition determining means for determining whether a control initiating condition required to initiate an output increase control for temporarily increasing said output of said drive power source is satisfied or not, depending upon whether an operation to accelerate the vehicle is performed during said coasting of the vehicle while said frictional coupling device is placed in a released state; and output increase control means operable when said control initiating condition determining means determines that said control initiating condition is satisfied, for effecting said output increase control such that said output of said drive power is larger by a predetermined amount than when said output increase control is not effected, so that said output increase control by said output increase control means reduces a time required for said frictional coupling device to be engaged to place said automatic transmission in said power transmitting state for accelerating the vehicle.

2. A cooperative control apparatus according to claim 1, wherein said frictional coupling device is a one-way clutch which is placed in an engaged state during said power driving of the vehicle, and is placed in said released state when an input shaft speed of said automatic transmission is lower than a synchronizing speed which is equal to a product of an output shaft speed of said automatic transmission and a speed ratio of a currently established forward drive position of said automatic transmission.

3. A cooperative control apparatus according to claim 1, wherein said output increase control means increases said output of said drive power source such that an input shaft speed of said automatic transmission, in the process of increase of said output of said drive power source, does not exceed a synchronizing speed which is equal to a product of an output shaft speed of said automatic transmission and a speed ratio of a currently established forward drive position of said automatic transmission.

4. A cooperative control apparatus according to claim 1, wherein said output increase control means increases said output of said drive power source such that said output is kept increased while an input shaft speed of said automatic transmission is not higher than a synchronizing speed which is equal to a product of an output shaft speed of said automatic transmission and a speed ratio of a currently established forward drive position of said automatic transmission.

5. A cooperative control apparatus according to claim 1, wherein said control initiating condition determining means includes input shaft speed determining means for determining whether an input shaft speed of said automatic transmission is lower than a synchronizing speed minus a predetermined first value, said synchronizing speed being equal to a product of an output shaft speed of said automatic transmission and a speed ratio of a currently established forward drive position of said automatic transmission, said output increase control means continuing to increase said output of said drive power source while said input shaft speed determining means determines that said input shaft speed is lower than said synchronizing speed minus said predetermined first value.

6. A cooperative control apparatus according to claim 1, wherein said control initiating condition determining means includes shift-down completion determining means for determining whether a shift-down action of said automatic transmission which has been initiated before said operation to accelerate the vehicle during said coasting of the vehicle has been substantially completed, said control initiating condition determining means determining that said control initiating condition is satisfied, when said shift-down completion determining means determines that said shift-down action has been substantially completed.

7. A cooperative control apparatus according to claim 1, wherein said control initiating condition determining means includes pre-shift-up-initiation determining means for determining whether a frictional coupling device which should be engaged to effect a shift-up action of said automatic transmission following a shift-down action of said automatic transmission which has been commanded before said operation to accelerate the vehicle during said coasting of the vehicle has not been substantially engaged, said control initiating condition determining means determining that said control initiating condition is satisfied, when said pre-shift-up-initiation determining means determines that said frictional coupling device which should be engaged to effect said shift-up action has not been substantially engaged.

8. A cooperative control apparatus according to claim 1, wherein said control initiating condition determining means includes vehicle acceleration determining means for determining whether an acceleration value of the vehicle is lower than a predetermined lower limit, said control initiating condition determining means determining that said control initiating condition is satisfied, when said acceleration determining means determines that said acceleration value is lower than said predetermined lower limit.

9. A cooperative control apparatus according to claim 1, further comprising control terminating condition determining means for determining whether a control terminating condition required to terminate said output increase control of said output of said drive power source is satisfied, said control terminating condition determining means including at least one of (a) time lapse monitoring means for determining whether a time lapse after a moment of initiation of an increase of the output of said drive power source has exceeded a predetermined maximum increase period, (b) input shaft speed determining means for determining whether an input shaft speed of said automatic transmission has been raised above a synchronizing speed minus a predetermined second value, said synchronizing speed being equal to a product of an output shaft speed of said automatic transmission and a speed ratio of a currently established forward drive position of said automatic transmission, and (c) accelerator non-operation detecting means for determining whether an accelerator pedal which has been depressed to perform said operation to accelerate the vehicle during said coasting of the vehicle has been returned to a non-operated position thereof, said control terminating means determining that said control terminating condition is satisfied, when at least one of said time lapse monitoring means, said input shaft speed determining means and said accelerator non-operation detecting means obtains an affirmative decision, said output increase control means continuing said output increase control of said output of said drive power source until said control terminating condition determining means determines that said control terminating condition is satisfied.

10. A cooperative control apparatus according to claim 1, wherein said output increase control means increases the output of said drive power source by an amount up to a predetermined maximum amount at a predetermined rate, hold said output at the increased value for a period of time which is a difference of a predetermined maximum period of increase of said output minus a period of time for which said output has been increased by said predetermined maximum amount, and then reduce said output at a predetermined rate.

11. A cooperative control apparatus according to claim 1, wherein said output increase control means includes increase amount determining means for determining a maximum amount of increase of said output of said drive power source depending upon a difference between a synchronizing speed and an input shaft speed of said automatic transmission, said synchronizing speed being equal to a product of an output shaft speed of said automatic transmission and a speed ratio of a currently established forward drive position of said automatic transmission, said output increase control means increasing said output of said drive power source by an amount up to said maximum amount determined by said increase amount determining means.

* * * * *

UNITED STATES PATENT AND TRADEMARK OFFICE
CERTIFICATE OF CORRECTION

PATENT NO. : 6,432,025 B1
DATED : August 13, 2002
INVENTOR(S) : Kondo et al.

It is certified that error appears in the above-identified patent and that said Letters Patent is hereby corrected as shown below:

<u>Title page,</u>
Item [54], the Title should read: -- APPARATUS FOR INCREASING VEHICLE DRIVE POWER SOURCE OUTPUT UPON ACCELERATOR PEDAL OPERATION DURING VEHICLE COASTING WITH AUTOMATIC TRANSMISSION IN RELEASED STATE --

Signed and Sealed this

Thirty-first Day of December, 2002

JAMES E. ROGAN
*Director of the United States Patent and Trademark Office*